Patented June 24, 1930

1,768,434

UNITED STATES PATENT OFFICE

KENNETH G. BLAIKIE, OF SHAWINIGAN FALLS, QUEBEC, CANADA, ASSIGNOR TO CANADIAN ELECTRIC PRODUCTS COMPANY, LIMITED, OF MONTREAL, CANADA

METHOD OF PREVENTING POLYMERIZATION OF VINYL COMPOUNDS AND REACTION OF SAME WITH ALDEHYDES

No Drawing.  Application filed August 15, 1927.  Serial No. 213,216.

This invention relates broadly to the manufacture and storage of certain synthetic materials made by the polymerization of vinyl compounds and to products made by the treatment of vinyl compounds with aldehydes, and more particularly refers to a method for preventing polymerization of vinyl compounds and preventing their reaction with ldehydes during the period of manufacture and storage.

It has been discovered that in carrying out the polymerization of vinyl compounds and the reaction of vinyl compounds with aldehydes that small traces of sulphur completely inhibited both polymerization and reaction with aldehydes.

In the manufacture of vinyl compounds, particularly vinyl esters, the material has a marked tendency to polymerize during distillation and, as a result, low yields are obtained. Also, during the period of storage, such materials tend to polymerize. It has been found that if small amounts of sulphur are added to the still during distillation, or added to the vessel during storage, it completely prevents the vinyl ester from polymerizing and from reacting with aldehydes. Amounts suitable for this purpose are one-tenth of 1%, although this amount may vary either above or below. Even traces of it are often sufficient. In fact, in working with vinyl compounds in the laboratory sufficient sulphur may be taken up from rubber connections to completely inhibit polymerization or reaction with aldehydes whether this polymerization or reaction would be otherwise effected by the agency of heat, heat and pressure, or by radiation with active rays.

Vinyl compounds or mixtures of these compounds with aldehydes which have been treated with sulphur to prevent polymerization or reaction may be freed from sulphur by distillation.

The invention, therefore, consists in treating vinyl compounds or mixtures thereof with aldehydes, with sulphur to prevent polymerization or reaction, as the case may be, during distillation or storage, and in freeing the compounds or mixtures of the same with aldehydes from the sulphur by distillation.

Having thus described my invention, what I claim is:—

1. The method of preventing polymerization of vinyl compounds, which comprises adding sulphur to the vinyl compounds.
2. The method of preventing polymerization of vinyl compounds in mixtures containing a vinyl compound, which comprises adding sulphur to the mixtures.
3. The method of preventing reaction of a vinyl compound with an aldehyde, which comprises adding sulphur to a mixture of a vinyl compound and an aldehyde.
4. The method of preventing reaction of a vinyl compound with an aldehyde in mixtures including a vinyl compound and an aldehyde, which comprises adding sulphur to the mixtures.

In witness whereof, I have hereunto set my hand.

KENNETH G. BLAIKIE.